United States Patent [19]

Dorscht

[11] Patent Number: 4,483,552

[45] Date of Patent: Nov. 20, 1984

[54] INDEPENDENT TELESCOPIC SUSPENSION

[75] Inventor: John P. W. Dorscht, Landmark, Canada

[73] Assignee: Versatile Corporation, Vancouver, Canada

[21] Appl. No.: 420,296

[22] Filed: Sep. 20, 1982

[51] Int. Cl.³ .............................................. B60G 3/00
[52] U.S. Cl. .................................... 280/690; 172/292; 180/159; 180/906; 280/707; 414/459
[58] Field of Search ............... 280/690, 689, 688, 691, 280/693, 638, 80 R, 707; 180/159, 906; 60/371, 369; 91/390, 363 R, 363 A; 414/459; 172/292

[56] References Cited

U.S. PATENT DOCUMENTS

| 3,522,861 | 8/1970 | Middlesworth et al. | 180/159 X |
| 3,666,286 | 5/1972 | Engfer | 280/707 |
| 3,964,565 | 6/1976 | Cagle et al. | 280/638 X |
| 4,014,564 | 3/1977 | Coble | 280/689 |
| 4,269,560 | 5/1981 | Thomas | 180/159 X |
| 4,270,771 | 6/1981 | Fujii | 280/707 |
| 4,271,922 | 6/1981 | Kishline | 280/666 X |
| 4,401,310 | 8/1983 | Ishikawa et al. | 280/707 X |

FOREIGN PATENT DOCUMENTS

| 209724 | 6/1960 | Austria | 280/638 |
| 1051044 | 2/1959 | Fed. Rep. of Germany | 280/638 |

Primary Examiner—Joseph F. Peters, Jr.
Assistant Examiner—Mitchell J. Hill
Attorney, Agent, or Firm—Wenderoth, Lind & Ponack

[57] ABSTRACT

A floating axle assembly for a vehicle. The assembly comprises an axle extending transverse to the longitudinal axis of the vehicle and beneath its frame. Wheels are connected to the axle and reinforcement members extend rearwardly from the axle to attachment points on the frame. Hydraulic cylinder assemblies are positioned above the axle and provide required support. The axle is telescopic and height adjustable. The configuration allows the center area of the vehicle to be cleared for crop flow.

15 Claims, 12 Drawing Figures

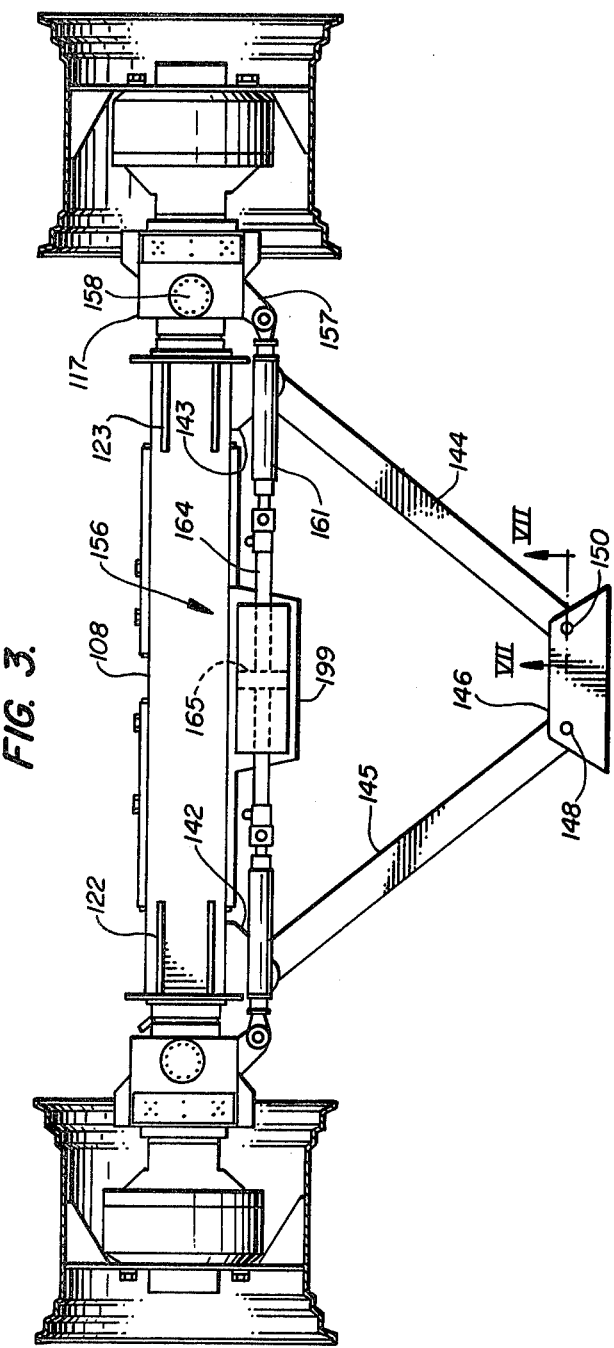

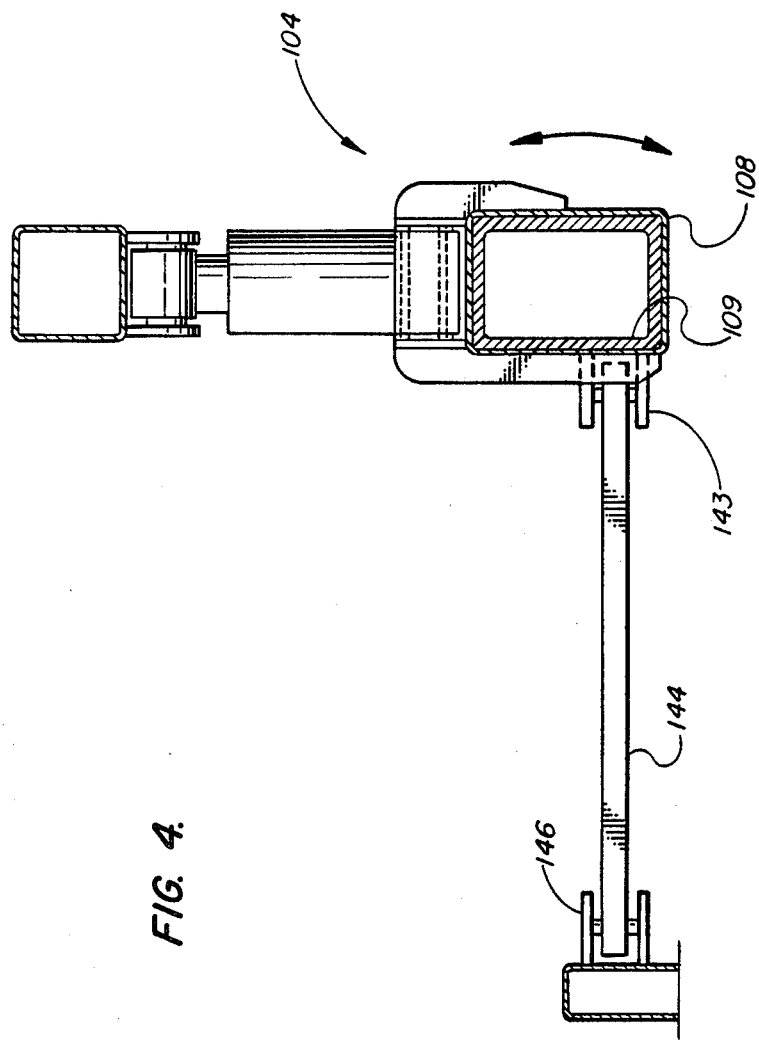

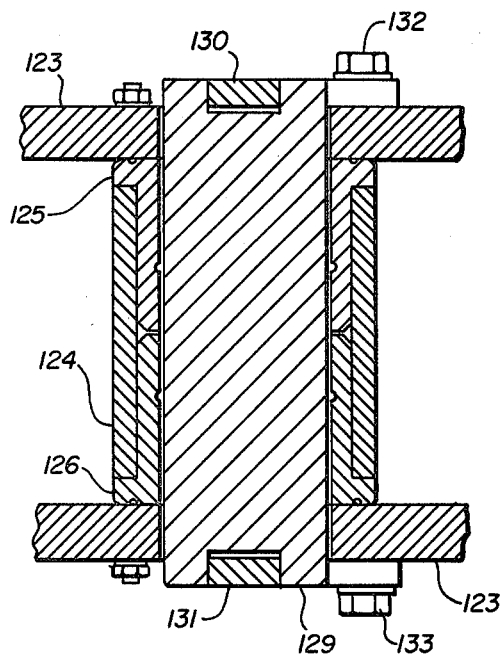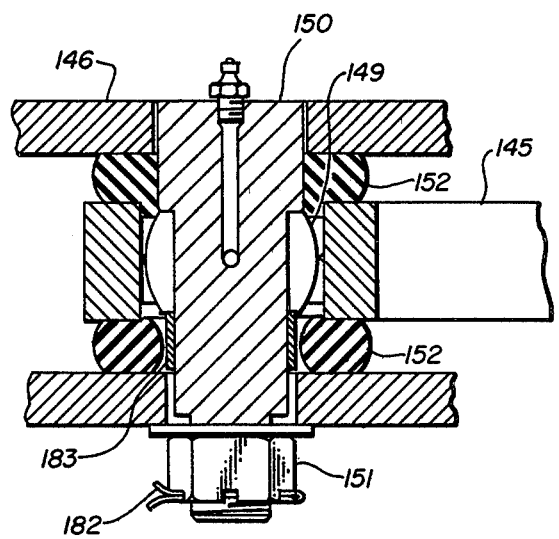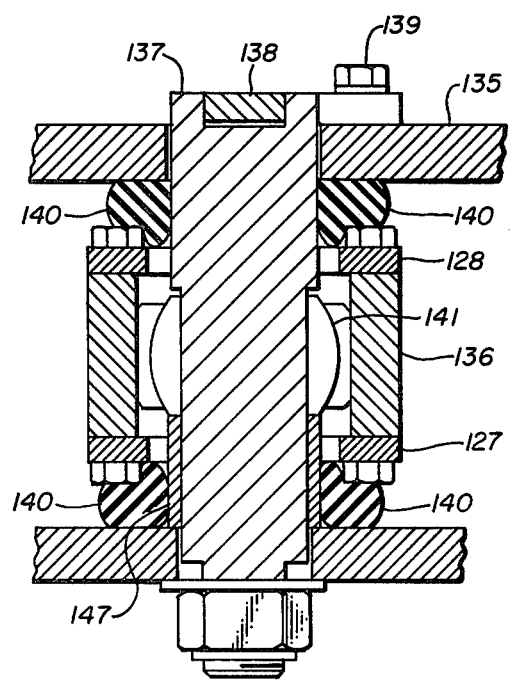

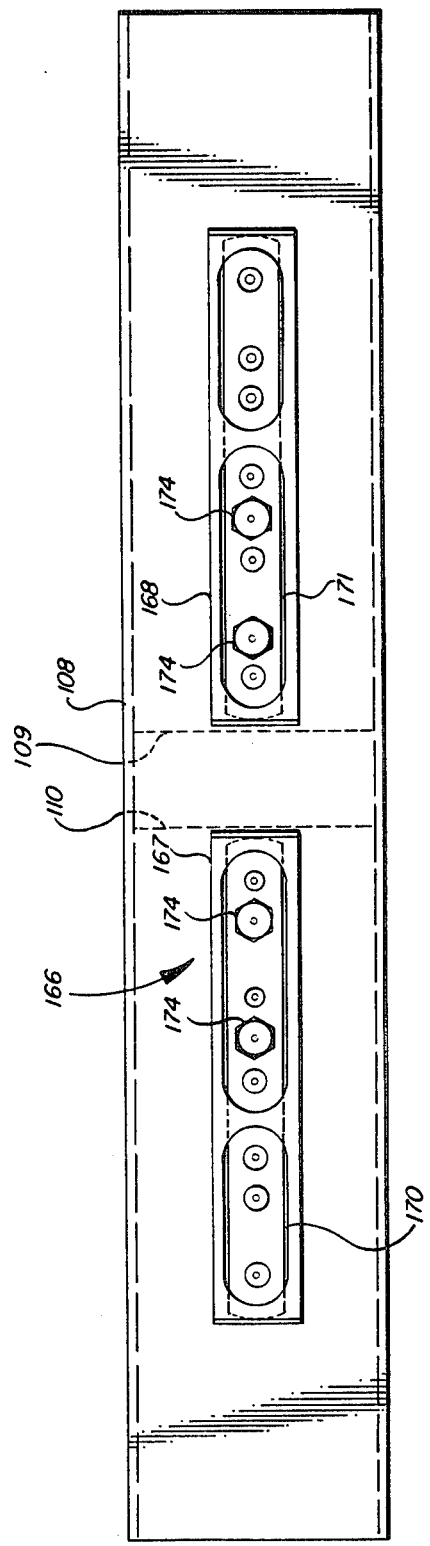

INDEPENDENT TELESCOPIC SUSPENSION

INTRODUCTION

This application relates to a floating axle assembly for use on off road equipment such as tractors, combines, harvesters and the like which equipment is used on uneven ground contours. More particularly, it relates to a floating axle assembly that is telescopic and height adjustable.

BACKGROUND OF THE INVENTION

Walking beam axles are known. These axles provide stability and reduce stress on vehicles used on uneven ground by keeping the contact areas of the vehicle tires on the ground surface without torsional input to the frame members. Generally, such axles are adapted to be used with a centre pivot beam. Where it is desirable to eliminate the centre pivot where the centre area is needed for other purposes, such previous axles are not satisfactory.

SUMMARY OF THE INVENTION

According to the invention, there is disclosed a floating axle assembly adapted for use on the frame of a vehicle, said assembly comprising an axle extending transverse to the longitudinal axis of and beneath said vehicle, wheels mounted to each end of said axle, a drag link means for each end of said axle, one end of each of said drag link means being mounted adjacent each end of said axle and extending to an opposite end mounted to said frame in a generally horizontal direction, hydraulic support means above said axle connecting said axle to said frame, said support means and said drag link means allowing restricted reciprocal vertical movement and oscillation of said axle about a longitudinal axis.

BRIEF DESCRIPTION OF THE SEVERAL VIEWS OF THE DRAWINGS

An embodiment of the invention will now be described, by way of example only, with reference to the accompanying drawings in which:

FIG. 2 is a partial view of the rear axle assembly and the steering linkage looking rearwardly of the combine harvester of FIG. 1;

FIG. 3 is a plan view of the axle assembly of FIG. 2;

FIG. 4 is a cutaway view of axle assembly taken along IV—IV of FIG. 2;

FIG. 6 is a cutaway view taken along VI—VI of FIG. 2;

FIG. 7 is a view taken along VII—VII of FIG. 3;

FIG. 8 is an enlarged view of the area VIII—VIII of FIG. 2;

FIG. 9 is a cutaway view taken along IX—IX of FIG. 2;

DESCRIPTION OF SPECIFIC EMBODIMENT

In the following description, reference will be made to the forward and rearward directions and to the left and right hand sides. These references will refer to areas as seen by an operator when in the operating console of the combine looking in the direction of forward movement of the combine.

Figure 1:
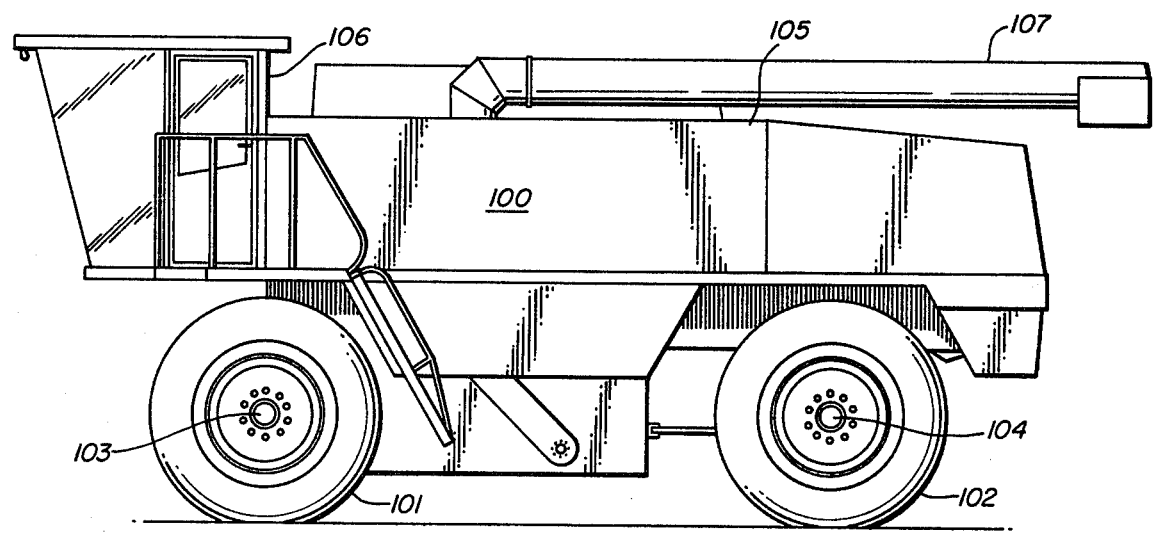
FIG. 1 is a side view of a combine harvester utilizing present invention.

Referring now to the drawings, a self propelled combine harvester is shown generally at 100 in FIG. 1. It comprises front and rear tires 101, 102 respectively, mounted on front and rear axle assemblies 103, 104 respectively, together with a crop pickup means (not shown), a grain storage tank 105, an operator's console 106, and an unloading chute 107.

The rear axle assembly 104 is shown generally in FIG. 2. As seen also in FIGS. 4 and 5, it comprises an outer axle tube 108, in the form of an O-section and a pair of telescoping inner axle tubes 109, 110 on the left and right hand sides of the centre line of the outer axle tube 108 respectively. The inner axle tubes 109, 110 are smaller in cross-section than the outer axle tube 108 and are adapted for inward and outward movement relative to outer axle tube 108. Hydraulic cylinders 111, 112 are mounted between the outer axle tube 108 and the frame 113 of the combine harvester 100.

Brackets 114, 115 are formed on the ends of inner axle tubes 109, 110. Left and right hand steering yokes 116, 117 respectively, are mounted, one in each bracket 114, 115. Wheel motors 118, 119 are mounted to left and right hand steering yokes 116, 117 respectively and left and right hand tire rim assemblies 120, 121 respectively, are mounted to hydraulic wheel motors 118, 119. Tires 101, 102 (FIG. 1) are mounted to the tire rim assemblies 120, 121 as shown.

Mounting brackets 122, 123 are mounted on each end of outer axle tube 108 as shown in detail in FIG. 6. One end 124 of hydraulic cylinder 112 is mounted in its respective mounting bracket 123. Two bushings 125, 126, are inserted into the end 124 of hydraulic cylinder 112. A pin 129 inserted through mounting bracket 123 and bushings 125, 126, allow rotation of the end of hydraulic cylinder 124 about the axis of the pin 129 and retains the end of hydraulic cylinder 124 in the bracket 123. Retaining straps 130, 131 fastened to mounting bracket 123 with bolts 132, 133 retain the pin 129 in position. The opposite joint in bracket 122 is similarly constructed.

Brackets 134, 135 are mounted to frame 113. The end 136 of hydraulic cylinder 112 is mounted within bracket 135 as seen in detail in FIG. 9. The pivot pin 137 retains end 136 of hydraulic cylinder 112 in bracket 135 and allows rotation of the hydraulic cylinder 112 about the pin 137. Pivot pin 137 is restrained within bracket 135 by a retaining strap 138 fastened to bracket 135 by capscrew 139. Seals 140 seal the ball joint 141 within the end 136 of the hydraulic cylinder 112. A spacer 147 ensures ball joint 141 is securely pressed against the recess in pivot pin 137 and provides stability for the pin 137. Ball joint 141 slides laterally within cylinder clevis housing 136 and is restrained by stop rings 127, 128.

Steering yokes 116, 117 each have top and bottom pivot pins (not shown) mounted between the steering yokes 116, 117 and their respective brackets 114, 115. The steering yokes 116, 117 rotate about the axis of their respective pivot pins and are steerable.

Referring to FIG. 3, two drag link brackets 142, 143 are mounted forwardly of outer axle tube 108 as also seen in FIG. 4. Left and right hand drag links 144, 145 are mounted in the drag link brackets 142, 143 using similar connections with pins 148, 150 as seen in more detail in FIG. 7. Drag links 144, 145 extend forwardly and inwardly from the drag link brackets 142, 143 to drag link mounting plate 146 which is connected to the frame 113 of the combine harvester 100. The drag links 144, 145 are connected to drag link mounting plate 146 by left and right hand pins 148, 150 and accompanying ball joints 149 (only one of which is shown in FIG. 7). Pin 150 is held in place by slotted nut 151 and cotter pin 182 on its threaded end. Seals 152 protect the pivot joint of drag link 145 from contamination and a spacer 183 ensures the ball joint 149 is held securely within the recess of the pin 150. A similar connection exists between drag links 144, 145 and each of drag link brackets 142, 143.

Figure 10:
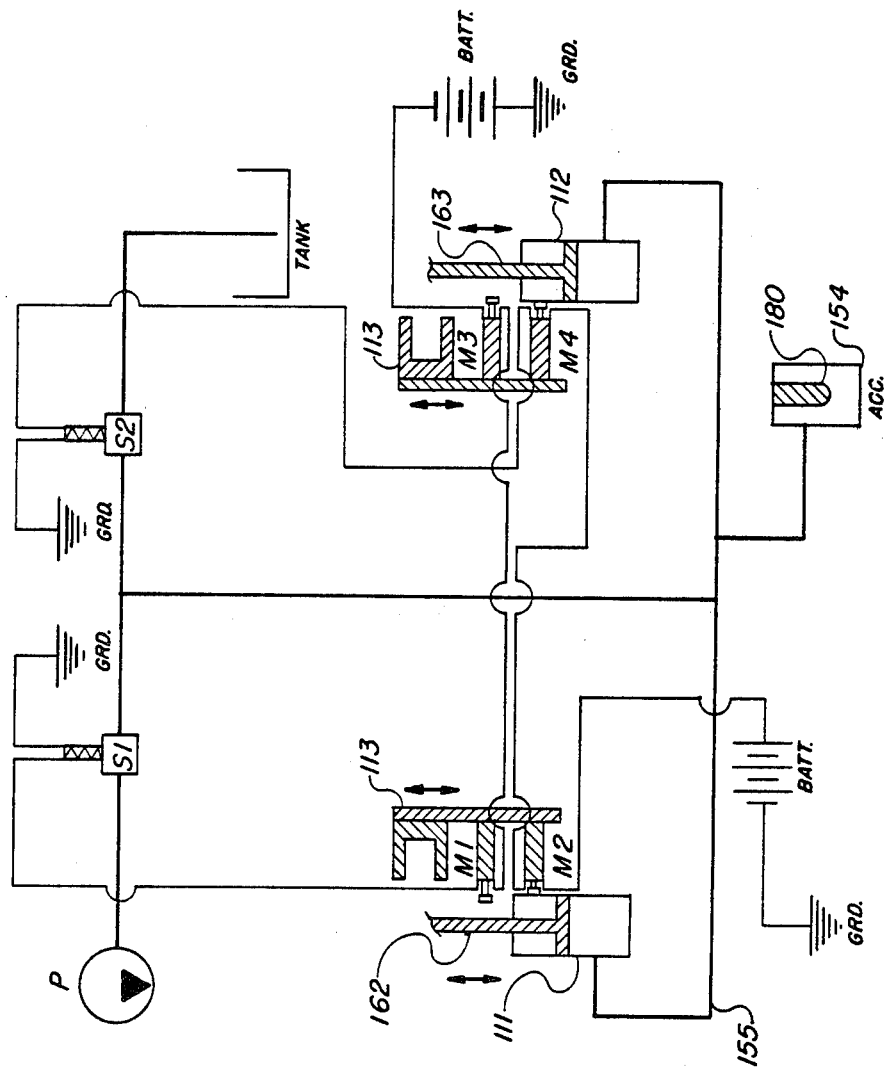
FIG. 10 is a schematic diagram of the hydraulic and electrical control system used for the combine harvester height adjustment.

The hydraulic and electrical circuit used for the hydraulic cylinders 111, 112 is depicted in schematic form in FIG. 10. An accumulator 154 containing a bladder 180 is connected to hydraulic line 155 which is connected to hydraulic cylinders 111, 112 at a point below the pistons 162, 163. On each respective cylinder 111, 112, two microswitches M1, M2, M3, M4, respectively, define an upper and lower limit for cylinder travel. Each pair of corresponding microswitches M1, M3 and M2, M4 is joined in series and, in turn, they are wired to operate respective solenoids S1, S2. The solenoids S1, S2 control the operation of fluid running, respectively, from hydraulic pump P and to TANK. Each microswitches M1, M2, M3, M4 is operated by a portion (not shown) in or out of contact with the respective cylinder as will be explained hereafter.

The steering assembly is shown generally at 156 in FIG. 3. The right hand steering yoke 117 is connected to steering pivot arm 157 which is offset from axis 158. A tie rod tube 161 is connected at one end through an adjustable linkage to pivot cap 157 and, at the other end, to piston rod 164 through another adjustable linkage. A piston 165 is mounted on piston rod 164 within single piston double acting hydraulic cylinder 159.

Figure 5:
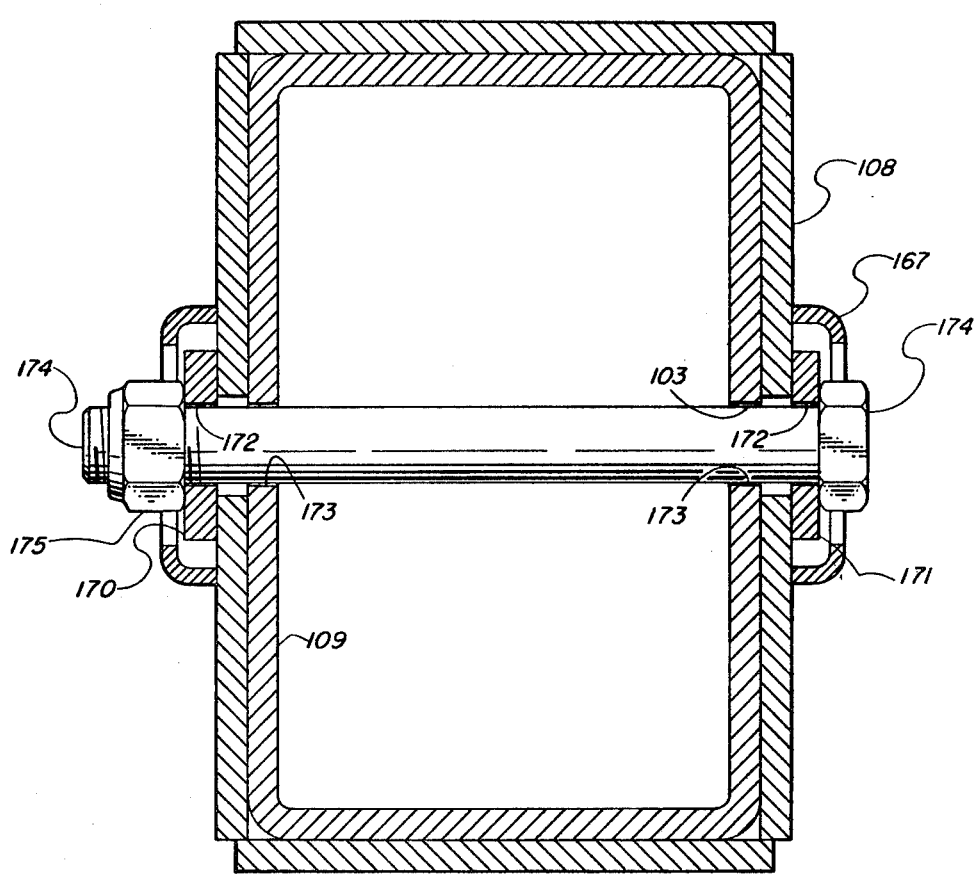
FIG. 5 is a partial cutaway view taken along V—V in FIG. 2.

The axle lock assembly is shown generally at 166 in FIG. 2 and in more detail in FIGS. 5 and 8. The outer axle tube 108 extends transverse to the combine and housings 167, 168 are mounted thereon, one on each side of the outer axle tube 108. Plates 170, 171 are mounted on the outside of outer axle tube 108 and contain eight bores 172, that is, eight in each plate 170, 171. The inner axle tube 109 has four bores 173 drilled through the inner axle tube 109, two aligned longitudinally on each side. Bolts 174 retain the assembly and are fastened by nylock nuts 175. Four bolts 174 (two per side) are used on each side of the outside axle tube 108 as seen in FIG. 8. Sixteen bores are drilled (eight per side) in outer axle tube 108. Four (two per side) are aligned longitudinally in inner axle tube 109.

OPERATION

In operation, it will be assumed the axle assembly 104 is in the configuration shown in FIG. 2 and that it is desired to move the wheels outwardly.

With reference also to FIGS. 5 and 8, the outer axle tube 108 is lifted to remove the tires 101, 102 from the ground and bolts 174 are removed from the outer axle tube 108 and the inner axle tubes 109, 110. The inner axle tubes 109, 110 are moved outwardly within outer axle tube 108. The steering assembly 156 must also be adjusted and this is done by changing the tie rod tubes 161 or, alternately, by providing for the necessary increase in length of the steering assembly 156 in the adjustable linkages connected to the tie rod tube 161 and piston rod 164. When the desired bores in inner axle tubes 109, 110 are aligned with the bores in plates 170, 171 and outer axle tube 108, the bolts 174 are re-inserted and the nylock nuts 175 are reattached to retain the axle assembly 104 in its operating position.

The combine harvester 100 will be filled with grain as the crop is cut and, therefore, the weight of the combine will increase causing the distance between the ends of hydraulic cylinders 111, 112 to decrease. The bladder 180 in accumulator 154 will contact to keep the hydraulic pressure constant. With reference to FIG. 10, as the distance between the ends of hydraulic cylinders 111, 112 decreases to a pre-determined value, microswitches M1 and M3 which are attached to the frame 113 which, in turn, is connected to the end of pistons 162, 163 will contact the cylinders 111, 112 and operate solenoid S1. This will allow hydraulic fluid to flow from hydraulic pump P into hydraulic cylinders 111, 112 below the pistons 162, 163 thereby increasing the height of the combine until both of the microswitches M1, M3 no longer contact the respective cylinders 111, 112 whereupon solenoid S1 will close preventing additional fluid from passing to the cylinders 111, 112.

When the combine harvester 100 is being unloaded, the weight will decrease causing the distance between the ends of hydraulic cylinders 111, 112 to increase. The bladder 180 in accumulator 154 will expand to keep the pressure in the hydraulic circuit constant. As this distance increases to a predetermined value, microswitches M2, M4, which were previously in contact with cylinders 111, 112 will lose contact. This initiates operation of solenoid S2 allowing hydraulic fluid to leave the cylinders 111, 112 and flow to the TANK until the distance between the ends of hydraulic cylinders 111, 112 is such that microswitches M2, M4 again contact the cylinders 111, 112 whereupon solenoid S2 will close and prevent further fluid flow out of cylinders 111, 112.

It will be noted that each respective pair of microswitches are in series. Accordingly, if the combine is on uneven ground, the height attitude of the combine will not change due to the increase or decrease in hydraulic fluid within the cylinder. Both corresponding microswitches M1, M3 or M2, M4, respectively must be either closed or open to initiate a change in quantity of hydraulic fluid within the cylinders 111, 112. Similarly, it will also be noted that the condition of solenoids S1, S2 will always be opposed. That is, if solenoid S1 is in an open position allowing fluid to pass, solenoid S2 is in a closed position and vice versa. In addition to regulating combine height during operation, the height control also is operable as inherent seepage through the cylinders allows the combine to settle over a period of time.

As the combine harvester 100 is operated the impact received by the tires 101, 102 is transferred to outside axle tube 108. Axle tube 108 moves vertically through an arc defined by drag links 144, 145 (FIG. 4) in response to the ground contour and the hydraulic cylinders 111, 112 act to dampen the impacts together with accumulator 154. As the ends of axle assembly 104 move vertically as depicted by the arrow in FIG. 4, drag link 144 rotates within bracket 143 on one end and within drag link mounting plate 146 at the opposite end. The bracket 143 and plate 146 allow sufficient rotation of drag link 144 to permit the necessary vertical movement of the axle assembly 104. As seen in FIG. 6, the connection in mounting bracket 123 is a rigid connection allowing rotation only about pin 129. All torque from the wheel movement, therefore, is transmitted through the connection in mounting bracket 123 to the bracket 135 and, thence, to the frame 113 through the connection depicted in FIG. 9.

The operator steers the combine 100 by utilizing a hydraulic circuit operated from the steering wheel (not shown). Oil is pumped into either the left or right hand side of piston 165 within double acting hydraulic cylinder 159. If, for example, the operator wanted to turn to the left, he would turn the steering wheel (not shown) to the left which would, in turn, cause oil to flow into cylinder 159 on the right hand side of the piston 165. At the same time, oil would flow outwardly from the cylinder 159 on the left hand side of the piston 165. The piston 165 thereby moves the steering assembly 156 including steering yokes 116, 117, wheel motors 118, 119 and tires 101, 102.

Figure 11:
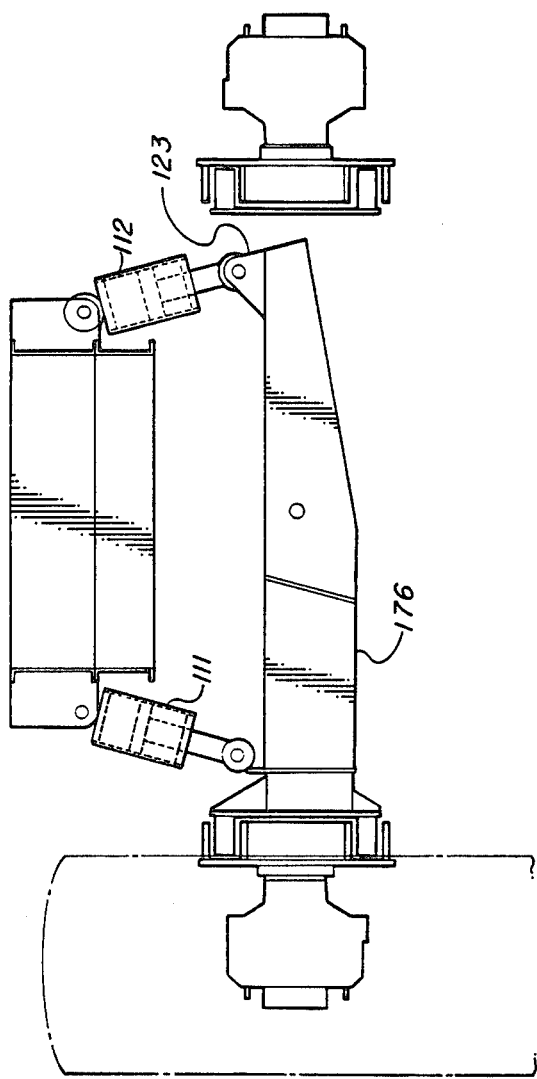
FIG. 11 is a partial view of a second embodiment of the axle assembly of the present invention.
Figure 12:
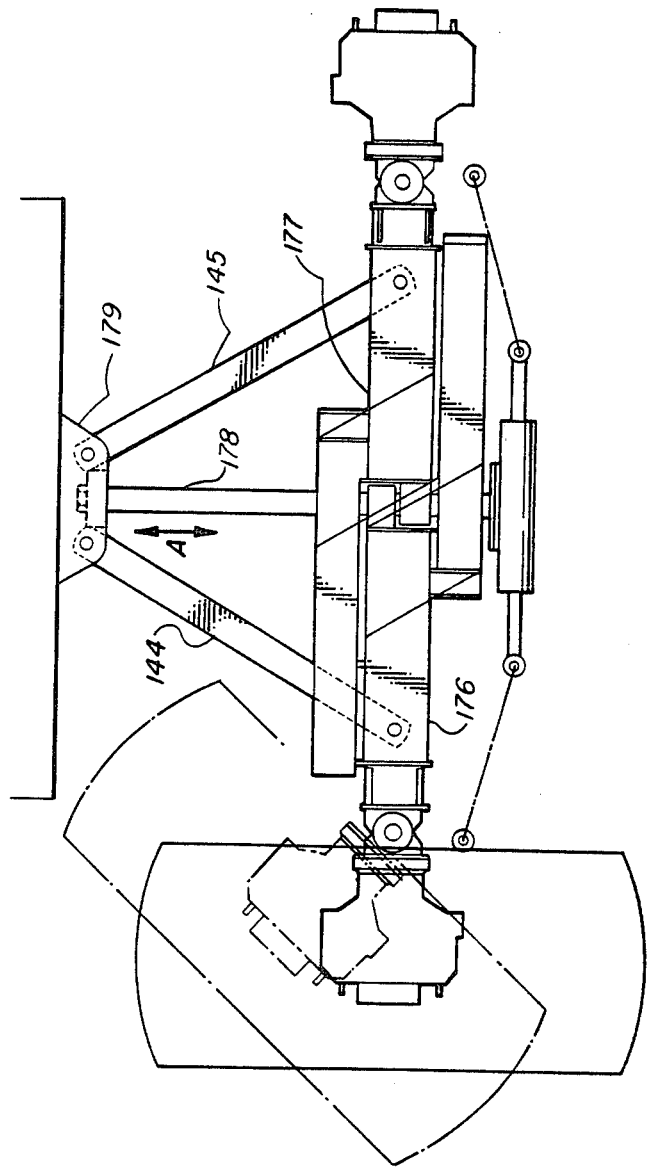
FIG. 12 is a plan view of the axle assembly of FIG. 11.

A second embodiment of the axle assembly is shown in FIGS. 11 and 12. This embodiment is similar to the apparatus of the earlier embodiment, the principal difference being that the assembly depicted in FIGS. 11 and 12 is independently operable as well as floating. Instead of a single axle, left and right hand beam sections 176, 177 respectively, are rotatably mounted on torsion shaft 178. Hydraulic cylinder 112 is mounted in bracket 123 which is connected to the top of beam section 176. Likewise, a similar bracket (not shown) is connected to the top of beam section 177 and hydraulic cylinder 111 is mounted therein.

Torsion shaft 178 extends from beam sections 176, 177 to bracket 179 where it is mounted through a splined connection, such that the shaft 178 may move longitudinally within bracket 179 as indicated by arrows A. No torsional movement about its longitudinal axis within bracket 179 is possible.

Beam sections 176, 177 are mounted for rotation on a splined portion at the end of torsion shaft 178 opposite from bracket 179. The splined connection allows rotation on torsion shaft 178. They cannot, however, move longitudinally. Right and left hand drag links 145, 144 respectively, extend from beam sections 176, 177 to bracket 179.

The second embodiment acts in a similar manner to the first embodiment. Inner axle tube assemblies (not shown) are moved outwardly within left and right hand beam sections 176, 177 as was the case with the first embodiment. The steering mechanism (not shown) is also adjusted similarly to that of the first embodiment. The principle difference between the two embodiments is that the second embodiment has two axle beam sections 176, 177 rather than one and each is independently rotable about torsion shaft 178.

Accordingly, there has been described a new axle assembly which is subject to many modifications which may still fall well within the spirit and scope of the invention which should be limited only by reference to the accompanying claims.

I claim:

1. A floating axle assembly adapted for use on the frame of a vehicle, said assembly comprising an axle extending transverse to the longitudinal axis of and beneath said vehicle, wheels mounted to each end of said axle, a drag link means for each end of said axle, one end of each of said drag link means being mounted adjacent each end of said axle and extending to an opposite end mounted to said frame in a generally horizontal direction, hydraulic support means above said axle connecting said axle to said frame, said support means and said drag link means allowing restricted reciprocal vertical movement and oscillation of said axle about a longitudinal axis.

2. An axle assembly as in claim 1 wherein one end of each of said drag link means is rotatably mounted on said axle and said opposite end of each of said drag link means is rotatably mounted on said frame.

3. An axle assembly as in claim 2 wherein said hydraulic support means comprises hydraulic cylinder means mounted between said axle and said frame on each side of said axle.

4. An axle assembly as in claim 3 wherein the ends of said hydraulic cylinder means are connected to bushings mounted in said frame and said axle, each of said bushings having a longitudinal axis transverse to the longitudinal axis of said axle, said bushings allowing rotation of said shock absorbers about said longitudinal bushing axles only.

5. An axle assembly as in claim 4 wherein said axle comprises inner and outer arm beam sections, said inner arm beam sections being mounted for axial movement relative to said outer arm beam sections and said wheels being mounted on the end of said inner arm beam sections.

6. An axle assembly as in claim 5 wherein each wheel is mounted to a respective inner arm beam section, each of said inner arm beam sections being respectively moveable outwardly and inwardly relative to said outer arm beam section.

7. A floating axle assembly adapted for use on the frame of a vehicle, said assembly comprising an axle extending transverse to and beneath said frame, wheels mounted on each end of said axle, drag link means rotatably mounted adjacent each respective end of said axle and extending to said frame in a generally horizontal plane and rotatably mounted thereon, hydraulic support means mounted between said frame and said axle adjacent opposed ends of said axle and connecting said axle to said frame, said hydraulic support means being adjustable to vary the height of said frame, said hydraulic support means and said drag link means allowing limited reciprocal vertical movement and oscillation of said axle.

8. A floating axle asembly as in claim 1 wherein the distance of said frame from the ground is adjustable by said hydraulic support means.

9. A floating axle assembly as in claim 1 wherein said axle comprises two beam sections, each of said beam sections being rotatably mounted on a shaft, said shaft extending from said beam sections forwardly to said frame, each of said beam sections having a first end connected to one of said hydraulic support means and a second end opposed from said first end connected to one of said wheels, said first and second ends of each of said beam sections being positioned on opposite sides of said shaft.

10. A floating axle assembly as in claim 9 wherein said shaft is mounted to said frame through a splined coupling, said coupling allowing in and out movement within said couplings and prohibiting rotational movement.

11. A floating axle assembly as in claim 10 wherein said shaft is mounted to said frame between the end of drag link means mounted on said frame.

12. A floating axle assembly as in claim 11 wherein said wheels are steerable.

13. A floating axle assembly adapted for use on the frame of a vehicle, said assembly comprising an axle extending transverse to the longitudinal axis of and beneath said vehicle, said axle having two beam sections, each of said beam sections being rotatably mounted on a shaft, wheels mounted to each each of said axle, a drag link means for each end of said axle, one end of each of said drag link means being mounted adjacent each end of said axle and extending to an opposite end mounted to said frame in a generally horizontal direction, hydraulic support means above said axle connecting said axle to said frame, said support means and said drag link means allowing restricted reciprocal vertical movement and oscillation of said axle about a longitudinal axis, each of said beam sections having a first end connected to one of said hydraulic support ends and a second end opposed from said first end connected to one of said wheels, said second end and said first end of each of said beam sections being positioned on opposite sides of the axis of said shaft, said shaft extending from said beam sections forwardly to said frame, said shaft being mounted to said frame through a splined coupling, said coupling allowing longitudinal movement of said shaft within said coupling and prohibiting rotational movement of said shaft within said coupling.

14. A floating axle assembly as in claim 13 wherein said shaft is mounted to said frame between said ends of said drag link means mounted on said frame.

15. A floating axle assembly as in claim 14 wherein said wheels as steerable.

* * * * *